(12) United States Patent
Okuhara et al.

(10) Patent No.: US 9,015,361 B2
(45) Date of Patent: Apr. 21, 2015

(54) ELECTRONIC DEVICE AND CONTROL METHOD THEREFOR

(71) Applicant: Canon Kabushiki Kaisha, Tokyo (JP)

(72) Inventors: Ryusuke Okuhara, Yokohama (JP); Hitoshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/185,452

(22) Filed: Feb. 20, 2014

(65) Prior Publication Data

US 2014/0244865 A1 Aug. 28, 2014

(30) Foreign Application Priority Data

Feb. 27, 2013 (JP) ................................. 2013-037689

(51) Int. Cl.
*G06F 3/06* (2006.01)
*G06F 3/0482* (2013.01)
*G06F 12/00* (2006.01)

(52) U.S. Cl.
CPC ............ *G06F 3/0653* (2013.01); *G06F 3/0482* (2013.01); *G06F 3/0604* (2013.01); *G06F 3/0688* (2013.01); *G06F 12/00* (2013.01); *H04N 2201/0087* (2013.01)

(58) Field of Classification Search
CPC . G06F 12/00; H04N 2201/0087; H04N 69/18
See application file for complete search history.

(56) References Cited

U.S. PATENT DOCUMENTS

2008/0049252 A1* 2/2008 Sakuda ......................... 358/1.15
2013/0080692 A1* 3/2013 Feinberg et al. .............. 711/103

FOREIGN PATENT DOCUMENTS

JP 2005-223710 A 8/2005
JP 2011-128910 A 6/2011

\* cited by examiner

*Primary Examiner* — Zachary K Huson
(74) *Attorney, Agent, or Firm* — Cowan, Liebowitz & Latman, P.C.

(57) ABSTRACT

An electronic device using a removable recording medium detects the operational mode supported by the recording medium when the attached recording medium has a communication function, and displays a menu with an item corresponding to the operational mode. When the item corresponding to the operational mode is selected from the menu, the electronic device communicates with an external device using the communication protocol corresponding to the selected item. When a recording medium with a communication function is attached, the electronic device enables commanding wireless communication with a target device with a simple operation and without knowing what communication protocol is used.

15 Claims, 10 Drawing Sheets

F I G. 2
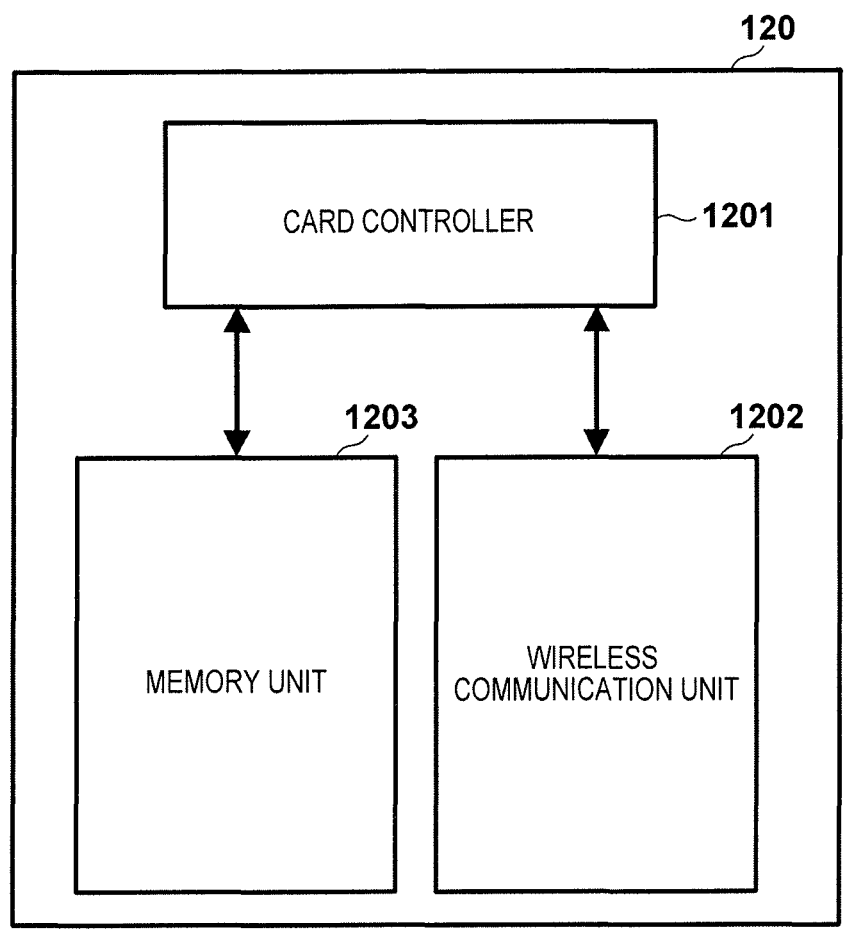

MEMORY CARD CAN
OPERATE IN DLNA MODE

MEMORY CARD CAN OPERATE
IN CAMERA OPERATION MODE

MEMORY CARD CAN
OPERATE IN PRINT MODE

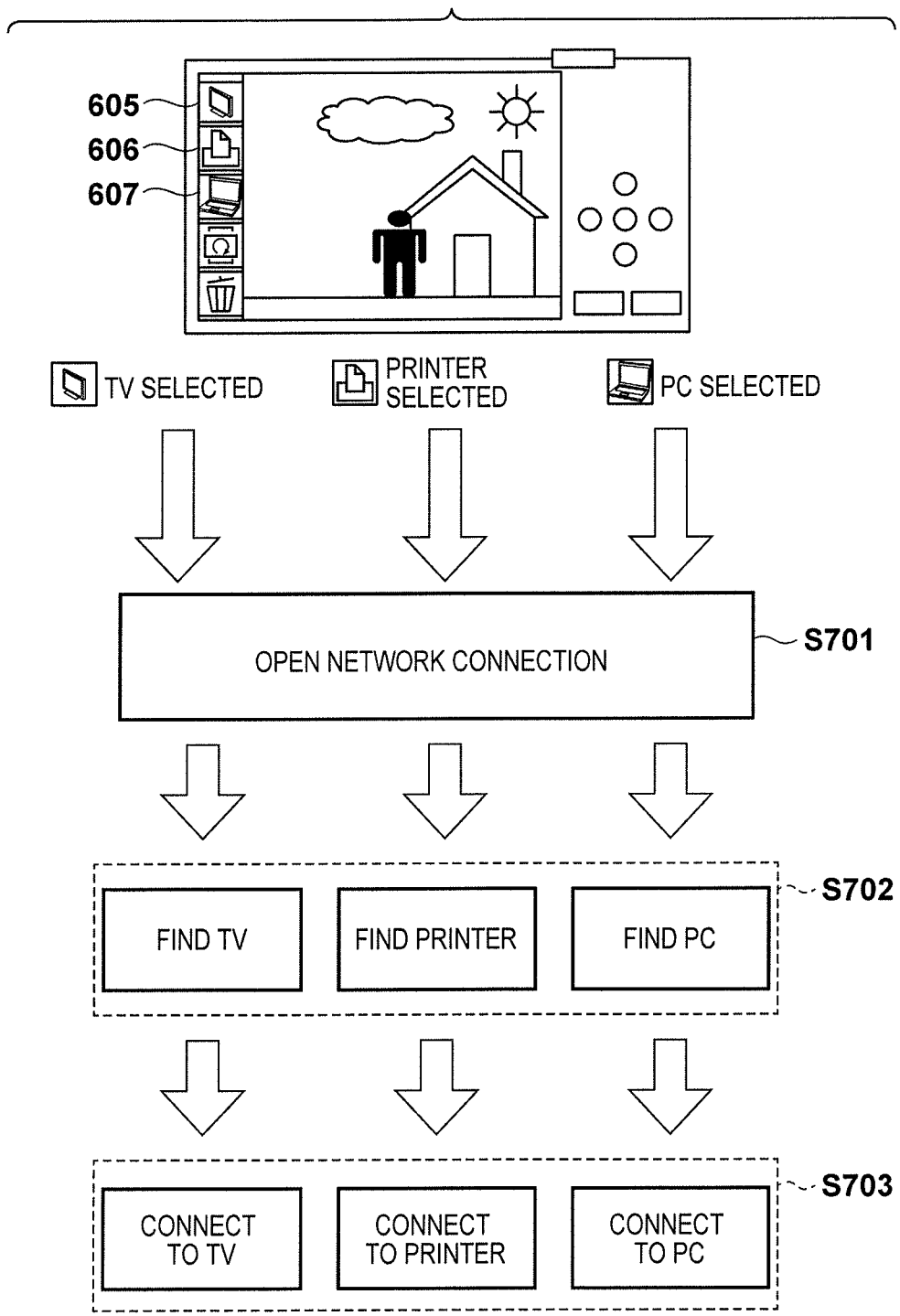

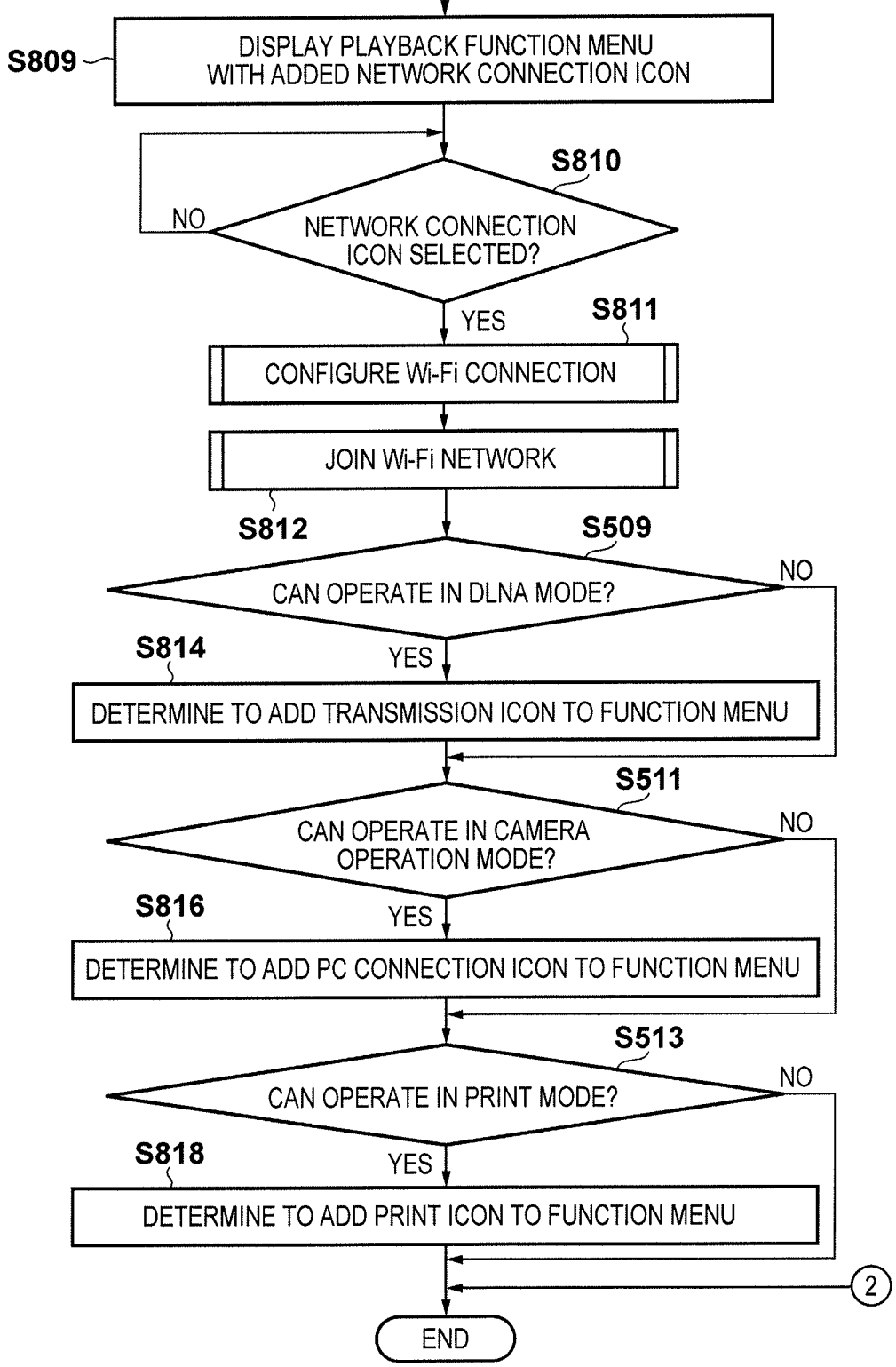

NETWORK CONNECTION

ELECTRONIC DEVICE AND CONTROL METHOD THEREFOR

BACKGROUND OF THE INVENTION

1. Field of the Invention

The present invention relates to an electronic device and a control method therefor, and relates more particularly to an electronic device that can use a recording medium with a wireless communication capability.

2. Description of the Related Art

Semiconductor memory cards are commonly used as a recording medium in digital cameras and other image capture apparatuses to store captured image data. To transfer the recorded image data to an external device such as a personal computer (hereinafter referred to as "PC"), a printer or television, the digital interfaces of the digital camera and the external device are usually connected by a cable. See, for example, Japanese Patent Laid-Open No. 2005-223710.

When transferring data between a digital camera and external device, data is conventionally exchanged according to a predetermined communication protocol over a cable or other physical communication path.

The PTP (Picture Transfer Protocol), which is standardized as a USB still image capture device class, and protocols defined as mass storage device classes, are commonly used as protocols for transferring data between PCs and digital cameras.

When a digital camera is connected to a Windows® or Mac OS® PC that supports the PTP at the OS level, the PC recognizes the connected device as a digital camera. This enables operations such as automatically launching a data transfer application and starting data transfer, simplifying operation for the user and improving convenience.

The PictBridge standard defining procedures enabling directly connecting a digital camera to a printer and printing directly from the camera has also been proposed. Because the PictBridge standard also uses the PTP for communication between devices, the user can operate the digital camera in the same way whether the external device to which the digital camera is connected is a PC or a printer as long as the digital camera supports the PTP communications.

Memory cards having a wireless communication capability so that image data can be easily transferred from a digital camera to an external device are also available these days. When such memory cards are attached and used in a digital camera, image data can be automatically transferred to an external device that is capable of wireless communication, and there is no need for the user to connect a cable or assert a clear transfer command.

Japanese Patent Laid-Open No. 2011-128910 discloses a digital camera that improves operability for the user by enabling a setting of the wireless communication capability when a memory card with a wireless communication capability is attached.

If a memory card with a wireless communication capability is compatible with multiple communication protocols, the memory card can connect to a wider range of devices and more applications are conceivable. However, ease of use is not good if the user must select the communication protocol required to connect to a desired device.

SUMMARY OF THE INVENTION

An electronic device and a control method therefor according to the present invention enable easily configuring wireless communication with a target device without the user knowing what communication protocol is used when a recording medium with a communication capability is attached.

According to an aspect of the present invention, there is provided an electronic device that uses a removable recording medium, comprising: a determination unit that determines whether or not an attached recording medium has a communication function; a detection unit that detects an operational mode supported by the recording medium when the recording medium is determined to have a communication function; a display unit that displays a menu from which an item corresponding to the operational mode can be selected; and a control unit that controls, when the item corresponding to the operational mode is selected from the menu, the communication function so as to communicate with an external device using a communication protocol corresponding to the selected item.

According to another aspect of the present invention, there is provided a control method of an electronic device that uses a removable recording medium, comprising the steps of: determining whether or not an attached recording medium has a communication function; detecting an operational mode supported by the recording medium when the recording medium is determined to have a communication function; displaying a menu from which an item corresponding to the operational mode can be selected; and controlling, when the item corresponding to the operational mode is selected from the menu, the communication function so as to communicate with an external device using a communication protocol corresponding to the selected item.

Further features of the present invention will become apparent from the following description of exemplary embodiments with reference to the attached drawings.

BRIEF DESCRIPTION OF THE DRAWINGS

FIG. 2 is a block diagram showing the functional configuration of the memory card 120 shown in FIG. 1.

FIG. 7 describes operation when an icon added to the menu is selected in the first embodiment of the invention.

FIG. 8 is a flow chart describing a process related to configuring wireless communication in a digital camera according to a second embodiment of the invention.

DESCRIPTION OF THE EMBODIMENTS

Exemplary embodiments of the present invention will now be described in detail in accordance with the accompanying drawings. To facilitate describing and understanding the invention, embodiments applying the invention to a currently common digital still camera (DSC) are described below as examples of an electronic device that can use a recording medium with a wireless communication capability. However, the invention is not limited to an image capture apparatus or a device including an image capture apparatus, and can be applied to any desirable device that can use a removable recording medium, including game machines, media players, general-purpose computers (PCs), televisions, video recorders, audio devices, and printers.

Note that a memory card that does not have a wireless communication capability is referred to below as a conventional memory card, and a memory card with a wireless communication capability is referred to as a wireless memory card. A wireless memory card further includes configurations using a conventional memory card with an adapter that adds a wireless communication capability.

Embodiment 1

Figure 1:
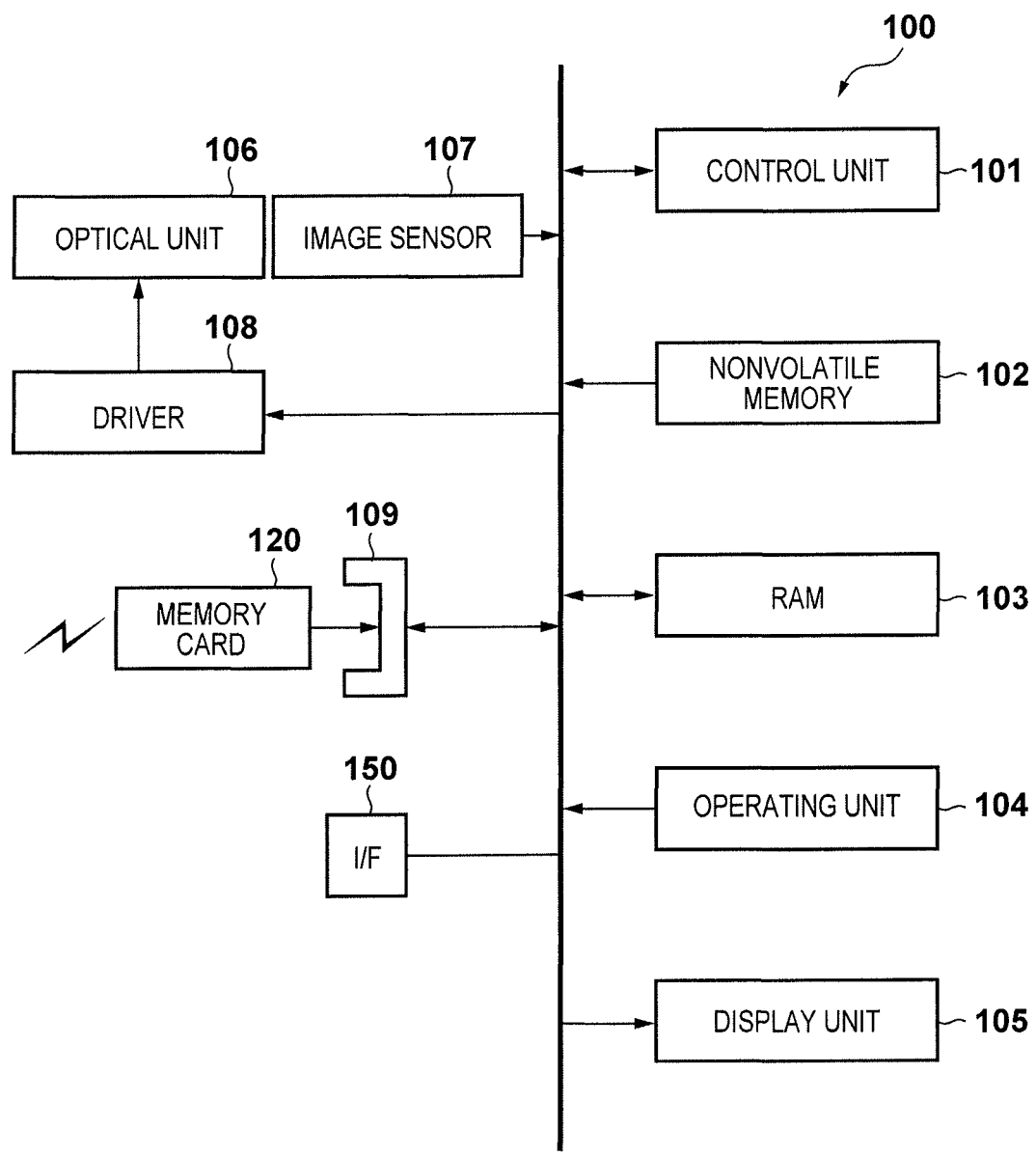
FIG. 1 is a block diagram showing an example of the functional configuration of a digital still camera described as an example of an electronic device according to an exemplary embodiment of the invention.

FIG. 1 is a block diagram showing an example of the functional configuration of a DSC 100.

The control unit 101 is a programmable processor such as a CPU or MPU, and controls operation of the DSC 100. The nonvolatile memory 102 stores procedures (programs) run by the control unit 101, DSC 100 settings, and data including menu screens and other elements of a graphical user interface (GUI). RAM 103 is used as a working area by the control unit 101. The operating unit 104 is a group of buttons and switches, and is used by the user to issue instructions to the DSC 100. The display unit 105 is an LCD (liquid crystal display), for example, and is used to display captured images and menus for making settings. The optical unit 106 primarily includes a lens (such as a zoom lens and focusing lens), and an actuator that drives the lens. The image sensor 107 is a CCD image sensor or CMOS image sensor, for example. The driver 108 controls the optical unit 106 as controlled by the control unit 101. Connector 109 is a connector for connecting (attaching) a memory card 120, which is a removable recording medium. As described below, the connector can mount or attach both a conventional memory card that does not have a wireless communication capability, and a wireless memory card having a wireless communication capability. A wireless memory card is further described below, and this embodiment describes operation when the mounted or attached memory card 120 is a wireless memory card. The interface (I/F) 150 is a digital interface such as USB, IEEE 1934, or HDMI, and is used for connecting to an external device through a wired connection.

FIG. 2 is a block diagram showing the functional configuration of the memory card 120 in FIG. 1. The memory card 120, which is a wireless memory card in this example, has a card controller 1201, wireless communication unit 1202, and memory unit 1203.

The card controller 1201 includes a CPU, ROM, and RAM, for example, and executes memory card 120 operations, which will be described later. Control of the wireless communication unit 1202, PTP communication with external devices over a wireless communication network, PTP communication with the DSC 100 as a host device, and operation as a recording medium in the DSC 100 are controlled by the card controller 1201.

The wireless communication unit 1202 has a wireless communication capability conforming to a wireless communication standard such as IEEE 802.11x or Bluetooth®, and communicates with an external device over a wireless communication network. In this embodiment, the wireless communication unit 1202 has a wireless communication capability that conforms to the IEEE 802.11a/b/g/n standards.

The memory unit 1203 includes NAND nonvolatile memory, for example, and stores still images, video, audio, and other data written through the card controller 1201. The memory card 120 records files conforming to a specific file system, such as DCF (Design rule for Camera File system), to function as a recording medium of the DSC 100. More specifically, the wireless memory card also has the functions of a conventional memory card.

Figure 3:
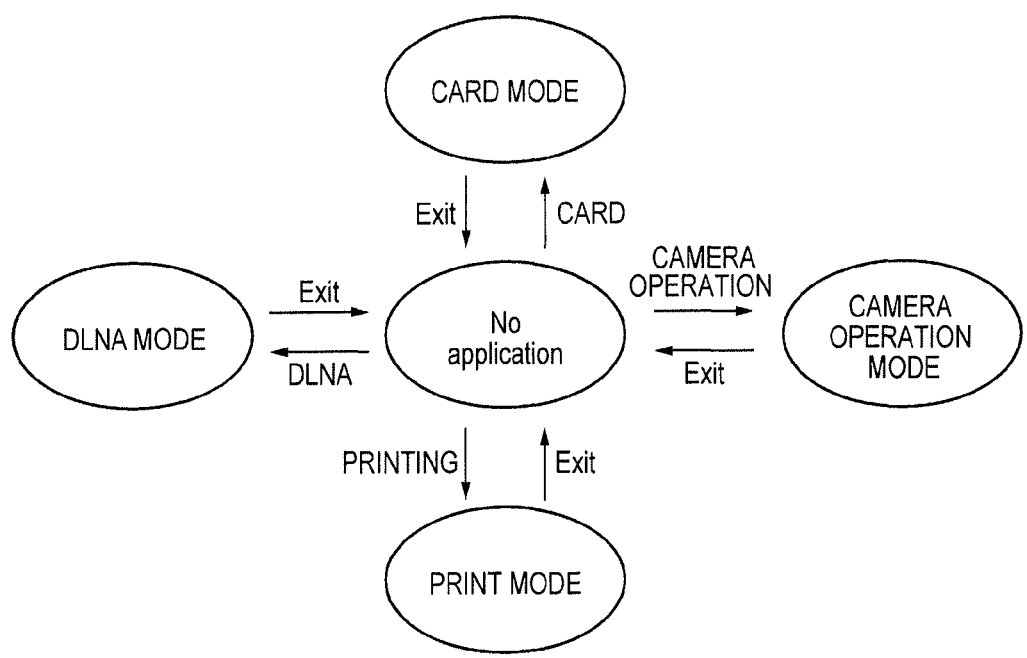
FIG. 3 is a state transition diagram for the memory card 120 in FIG. 1.

FIG. 3 is a state transition diagram for the memory card 120 in this embodiment. As described below, the memory card 120 can change the application mode based on a command from the DSC 100 functioning as a host device. A DLNA mode, card mode, camera operating mode, or print mode can be set as the application mode in this example. DLNA is an abbreviation for the Digital Living Network Alliance.

When set to the DLNA mode, the memory card 120 connects wirelessly to a network of home appliances, for example, conforming to the DLNA guidelines to function as a DMS (digital media server) and communicate with televisions and other appliances on the network.

In the card mode, the memory card 120 functions independently of the DSC 100 as the host device and communicates by the PTP with an external device on the wireless communication network. In the card mode, wireless communication and PTP communication use a protocol stack on the memory card 120.

The camera operating mode is an operational mode in which the memory card 120 functions as a wireless communication adapter of the DSC 100, and enables PTP communication between the DSC 100 and an external device on the wireless communication network. In the camera operating mode, wireless communication uses a protocol stack in the memory card 120, and PTP communication uses a protocol stack on the DSC 100.

The print mode is an operational mode enabling direct printing using a printer on the wireless network. Wireless communication uses a protocol stack in the memory card 120, and direct printing uses a protocol stack in the DSC 100.

A protocol stack is a group of software, and communication using a protocol stack in the memory card 120 means that the memory card 120 controls communication. Similarly, communication using a protocol stack in the DSC 100 means that the DSC 100 controls communication.

Note that as shown in FIG. 3, transitioning directly between these application modes is not possible, and the application mode always changes through a No Application mode. In the No Application mode, the memory card 120 executes operations required to maintain a network connection, or looks for a connectable network.

Figure 4A:
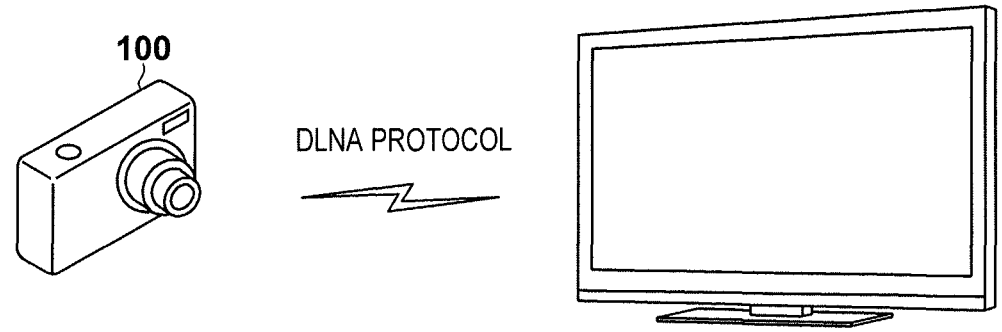
FIG. 4A and FIG. 4B schematically describe communication between a digital camera and a television, and between a digital camera and a printer, respectively.
Figure 4B:

FIG. 4A schematically describes communication between a DSC and television, and FIG. 4B schematically describes an example of communication between a DSC and printer. As described above, the DSC 100 must communicate by the DLNA protocol when the other device is a television, and communicate by a printing protocol when the other device is a printer. The user must therefore connect and select the protocol (application mode) appropriate to communicating with a television or communicating with a printer.

As shown in the state transition diagram shown in FIG. 3, the memory card 120 in this embodiment must go through the No Application mode in order to change the application mode. A procedure including a disconnect operation (switching to the No Application mode), switching to a different protocol, and specifying the device to connect to is required to go from communicating according to one protocol to communicating according to another protocol. In addition to determining the protocol (application mode) appropriate to the other device, this operation is tedious and not simple.

Figure 5A:
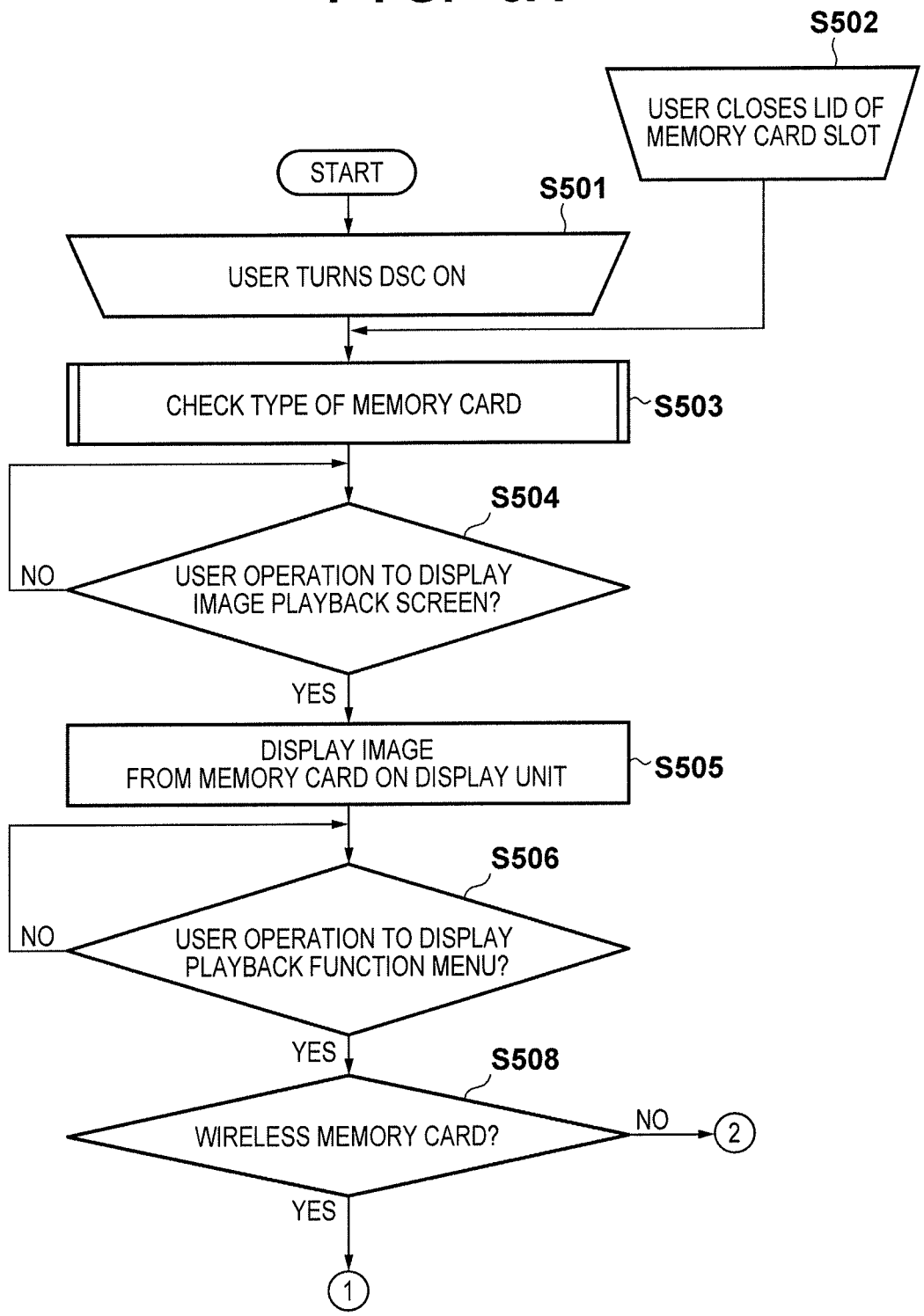
FIG. 5A and FIG. 5B are flow charts describing a process related to configuring wireless communication in a digital camera according to a first embodiment of the invention.
Figure 5B:
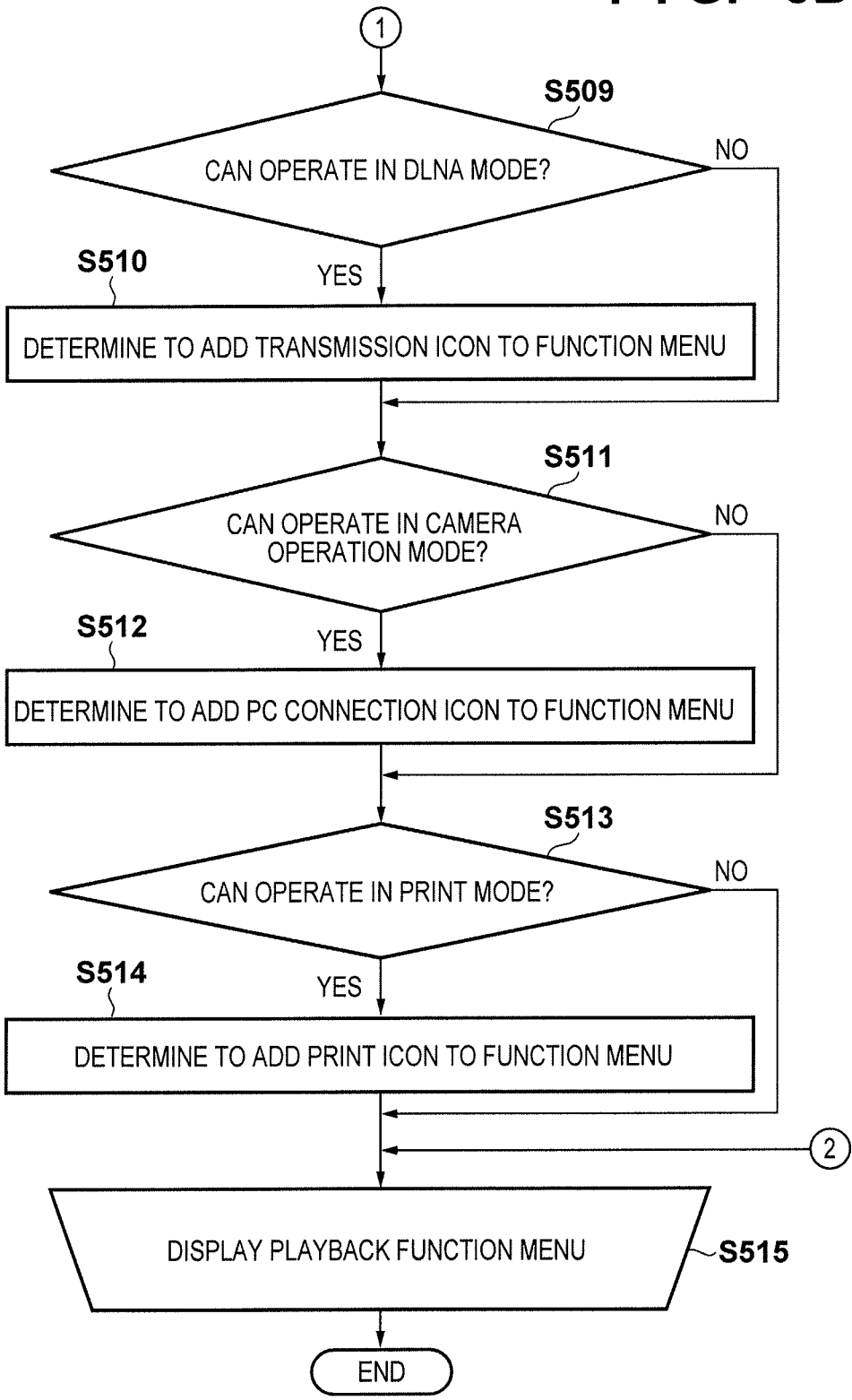

To reduce the burden on the user when configuring wireless communication, the DSC 100 according to this embodiment of the invention executes an operation such as shown in the flow charts in FIGS. 5A and 5B. This operation is executed by the control unit 101 controlling specific parts of the DSC 100.

The DSC 100 launches when the user turns the DSC 100 power on in S501, or the lid of the memory card slot is closed in S502. After launching, the control unit 101 determines the type (conventional memory card or wireless memory card) of the memory card 120 mounted in S503. The control unit 101 stores the result of this decision in RAM 103. The type of memory card 120 can be determined by a desirable method, including reading memory card 120 information.

Sending image data stored in the memory card 120 to an external device (such as a television, PC, or printer) is described below as an example of an application using wireless communication. The operation of the invention is therefore described as it relates to an operation for selecting the image data to be sent, but this operation is not limited to when selecting image data, and a GUI appropriate to the type of card can be displayed and the communication protocol appropriate to the other device can be automatically determined at any desired time.

In S504 the control unit 101 waits until the user performs an operation on the operating unit 104 to display the image playback screen. This operation could, for example, command switching from the imaging mode to the playback mode.

When the image playback screen is displayed, the control unit 101 references the image data stored in the memory card 120 and, for example, reads and displays the most recently taken pictures on the display unit 105 in S505.

In S506, the control unit 101 waits for the user to perform an operation on the operating unit 104 that displays the playback function menu. This operation could command displaying the menu screen, for example.

The playback function menu is a menu displaying items for issuing commands related to functions that can be performed on the displayed images. These items may include deleting, protecting, and editing images. Sending images to an external device by wireless communication is also included in these playback functions.

After an operation to display the playback function menu is performed, the control unit 101 in S508 references the result of determining the type of memory card in S503 that was stored in RAM 103. If the memory card 120 is a conventional memory card, the control unit 101 skips to S515 and displays a playback function menu including items related to native functions of the DSC 100 (functions that do not depend on whether or not the memory card 120 is a wireless memory card) on the display unit 105. The playback function menu displayed in this event is a basic menu containing only native functions of the DSC 100, such as items related to deleting and protecting images.

If in S508 the mounted memory card 120 is determined to be a wireless memory card, the control unit 101 detects the operational modes supported by the memory card 120 in S509, S511, and S513. The control unit 101 first determines in S509 if the memory card 120 can operate in the DLNA mode (if the memory card 120 supports the DLNA protocol).

If the memory card 120 is determined to be able to operate in the DLNA mode in S509, the control unit 101 determines to add a transmission function item to the playback function menu in S510, and then goes to S511. If the memory card 120 is not determined to be able to operate in the DLNA mode, the control unit 101 goes directly to S511.

The control unit 101 then determines in S511 if the memory card 120 can operate in a camera operation mode. If the memory card 120 can operate in the camera operation mode, the control unit 101 determines in S512 to add a PC connection function item to the playback function menu, and then goes to S513. If the memory card 120 cannot operate in the camera operation mode, the control unit 101 goes directly to S513.

The control unit 101 then determines in S513 if the memory card 120 can operate in a printing mode (if the memory card 120 supports a printing protocol). If the memory card 120 can operate in the printing mode, the control unit 101 determines in S514 to add a print function item to the playback function menu, and then goes to S515. If the memory card 120 cannot operate in the printing mode, the control unit 101 goes directly to S515.

In S515, the control unit 101 displays the playback function menu on the display unit 105. If the memory card 120 is a conventional memory card, the playback function menu displayed in S515 is a basic menu containing items relating only to the native functions of the DSC 100 (functions that do not depend on the memory card 120 being a wireless memory card).

However, if the memory card 120 is a wireless memory card, a playback function menu (expanded menu) containing the items added to the basic menu according to the results of S509, S511, and S513 is displayed.

Note that any method appropriate to the standard used by the memory card 120, for example, can be used to determine the results of S511, S513, S515.

Figure 6A:
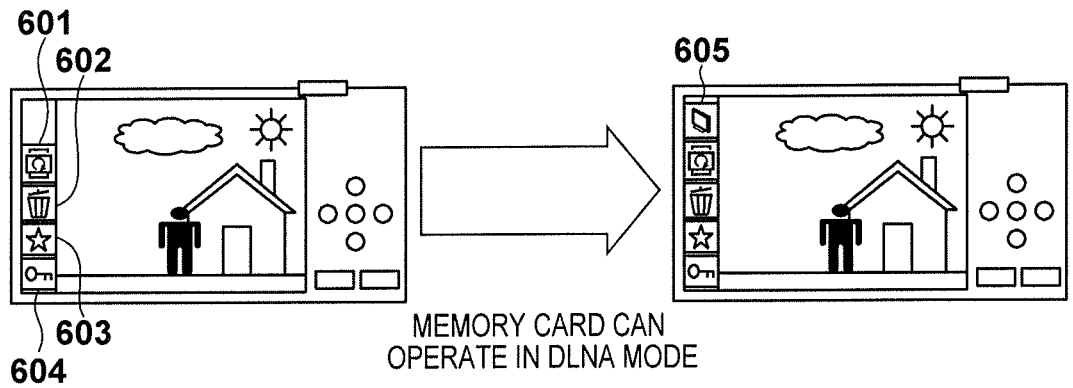
FIG. 6A to FIG. 6C show examples of the playback function menu displayed in a digital camera according to the first embodiment of the invention.
Figure 6B:
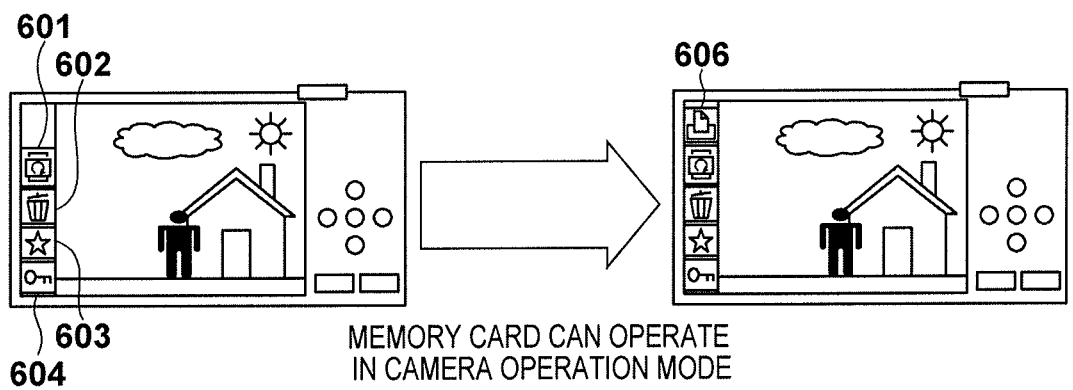
Figure 6C:
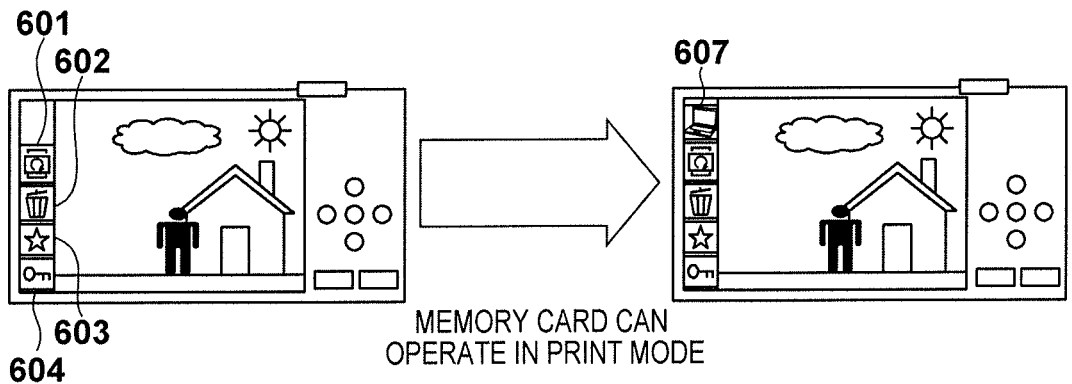

FIG. 6A to FIG. 6C show examples of playback function menus displayed on the display unit 105 in S515.

Examples of a playback function menu (basic menu) displayed in S515 are schematically shown on the left side in FIG. 6A to FIG. 6C. This playback function menu (basic menu) contains icons 601 to 604 respectively denoting an image rotation function, an image deletion function, a favorites function, and an image protection function. The display column of the playback function menu is scrollable, and the menu can be scrolled in the direction in which the icons are arranged (vertically in FIG. 6A) when the number of items represented by the icons exceeds the number that can be displayed in one screen.

Examples of the playback function menu (expanded menu) when the memory card 120 is a wireless memory card are shown on the right side in FIG. 6A to FIG. 6C.

An example of the playback function menu displayed when the memory card 120 is determined to be able to operate in the DLNA mode in S509 is shown on the right side of FIG. 6A. Because a communication function using the DLNA protocol, which is not a native function of the DSC 100, can be used through the memory card 120, an icon 605 of a typical television is added to the basic menu as an example of a target device that communicates through the DLNA protocol. Note that displaying menu items is not limited to using icons, and items could be displayed using only text or a combination of icon and text.

An example of the playback function menu displayed when the memory card 120 is determined to be able to operate in the printing mode in S513 is shown on the right side of FIG. 6B. Because a communication function using the printing protocol, which is not a native function of the DSC 100, can be used through the memory card 120, an icon 606 of a typical printer is added to the basic menu as an example of a target device that communicates through the printing protocol.

An example of the playback function menu displayed when the memory card 120 is determined to be able to operate in the camera operation mode in S511 is shown on the right side of FIG. 6C. Because a communication function (a wireless communication capability) that is not a native function of the DSC 100 can be used in the camera operation mode through the memory card 120, an icon 607 of a typical PC is added to the basic menu as an example of a target device that communicates through a wireless connection.

FIG. 6A to FIG. 6C show examples of the expanded menu when the memory card 120 satisfies only one of the conditions of S509, S511, and S513. However, when the memory card 120 is a wireless memory card that can operate in two or more of the DLNA mode, camera operation mode, and printing mode, an expanded menu to which the corresponding number of function icons are added is displayed. FIG. 7 shows an example of a playback function menu that is displayed when the memory card 120 is a wireless memory card that can operate in two or more of the DLNA mode, camera operation mode, and printing mode. The playback function menu in FIG. 7 also scrolls.

Operation when an added icon is selected from the expanded menu is described next with reference to FIG. 7.

When the icon 605 for the DLNA mode is selected by an operation of the operating unit 104, the control unit 101 starts a network connection process based on the DLNA protocol (S701). The control unit 101 then broadcasts a DLNA protocol device discovery command to find an external device (such as a television) that can connect through the DLNA protocol (S702). The control unit 101 displays information (such as the device name) about the external devices that respond to the device discovery command in a selectable list on the display unit 105, and connects to the external device selected from the list using the DLNA protocol (S703).

When the connection is completed, the DSC 100 and the selected external device can communicate, and the image data sent from the DSC 100 (the image displayed on the display unit 105 when the icon 605 is selected) is displayed by the external device (such as a television).

When the printer icon 606 is selected, the control unit 101 similarly starts a network connection process based on the printing protocol in S701. The control unit 101 then broadcasts a device discovery command based on the printing protocol to find an external device (such as a printer) that can connect based on the printing protocol (S702). The control unit 101 then displays information (such as the device name) about the external devices that respond to the device discovery command in a selectable list on the display unit 105, and connects to the external device selected from the list using the printing protocol (S703).

When the connection is completed, the DSC 100 and the selected external device can communicate, and the image data sent from the DSC 100 is printed by the external device (such as a printer).

When the PC icon 607 is selected, the control unit 101 similarly starts a network connection process in the camera operation mode in S701. In the camera operation mode, the control unit 101 controls wireless communication using the protocol stack in the memory card 120, and controls PTP communication using the protocol stack in the DSC 100. The control unit 101 then broadcasts a device discovery command to find an external device (such as a PC) that can connect in the camera operation mode (S702). The control unit 101 then displays information (such as the device name) about the external devices that respond to the device discovery command in a selectable list on the display unit 105, and connects to the external device selected from the list using the wireless protocol and the PTP (S703).

When the connection is completed, the DSC and the selected external device can communicate, and the image data sent from the DSC 100 is transferred to the external device (such as a PC).

Note that the operational mode corresponding to the type of target device selected through the expanded menu may differ from the current operational mode when the memory card 120 is a wireless memory card. In this event, the control unit 101 sets the memory card 120 to the No Application mode and then switches to the operational mode corresponding to the selected icon before starting the network connection process in S701.

Note that if only one external device responds to the device discovery command, connection could start automatically without waiting for a user selection.

As described above, this embodiment of the invention displays a menu based on whether or not the mounted memory card is a wireless memory card, and the operational mode that can be used (supported protocol) if it is a wireless memory card. Because a menu from which items related to functions that use wireless communication cannot be selected is displayed when a conventional memory card is mounted, the user can be prevented from mistakenly selecting functions that cannot be used. Typical external devices that communicate using the supported communication protocol are displayed by text or icons in a menu, and the protocol corresponding to the selected item is automatically selected. As a result, the user can simply select the type of device to connect to without knowing which protocol to use when connecting to a particular device. When there are a plurality of connectable external devices, communication with a desired device can start by simply selecting the name of the device, for example. An electronic device with good ease of use can therefore be provided.

The DSC 100 could also control the display order of the icons in the menus shown in FIG. 6A to FIG. 6C based on the history of application mode use. For example, of the icons corresponding to the application modes displayed in the playback function menu, the icon corresponding to the most recently used application mode could be displayed (such as at the top of the menu). Alternatively, the application modes could be ordered by the frequency of use in the playback function menu.

Embodiment 2

A second embodiment of the invention is described next with reference to FIGS. 5A, 8, and 9.

When a function (icon) of a wireless memory card displayed in the playback function menu is selected in the first embodiment, a network connection is made using the protocol corresponding to the selected function. This embodiment, however, makes a network connection before an icon is selected from the playback function menu. To facilitate description and understanding, this embodiment is described using the same DSC 100 described in the first embodiment.

In addition to communication devices communicating directly by wireless communication (ad hoc mode), communication can also be relayed through a device known as an access point (AP) (infrastructure mode). In the infrastructure mode, one device communicates with the AP, and the AP communicates with the other (target) device. Because an AP normally has a network management function, the infrastructure mode may be more efficient as the number of communication devices increases. Processing by the communication devices is also often simpler in the infrastructure mode.

An AP manages communication using a network identifier called an ESSID. Each device specifies an ESSID to join the network managed by the AP, and devices on the same network connect and communicate through the AP.

FIGS. 5A and 8 are flow charts describing the process of the DSC in this embodiment. Note that steps S501 to S508 in this embodiment are the same as those shown in FIG. 5A and described in the first embodiment, and thus further description thereof is simplified or omitted.

Steps performed after determining in S508 that the mounted memory card 120 is a wireless memory card are described below.

In S809, the control unit 101 displays a playback function menu having an item (icon) for a network connection function added to the basic menu on the display unit 105.

Figure 9:
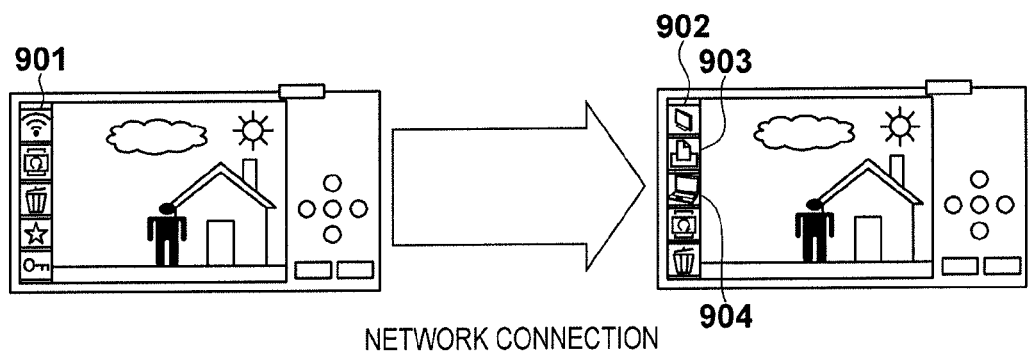
FIG. 9 shows an example of the playback function menu displayed in a digital camera according to the second embodiment of the invention.

An example of the playback function menu displayed in S809 is shown on the left side in FIG. 9. An icon 901 for a network connection function has been added. Because the operations the memory card 120 can perform have not been determined at this point, items for wireless functions are not included in the menu.

If the icon for the network connection function is selected in S810, the control unit 101 configures the settings required to make a wireless network connection in S811, and then joins the wireless LAN in S812. More specifically, the control unit 101 looks for a wireless LAN network, or specifies an ESSID, and connects to the network with the target ESSID. At this stage the DSC 100 connects to the AP and becomes one of the devices on the wireless network, but is still not connected to a device other than the AP.

In S509, the control unit 101 determines if the memory card 120 can operate in the DLNA mode (if the memory card 120 supports the DLNA protocol).

If the memory card 120 is determined to be able to operate in the DLNA mode in S509, the control unit 101 adds an item (icon) for a transmission function to the displayed playback function menu in S814, and then goes to S511. If the memory card 120 is not determined to be able to operate in the DLNA mode, the control unit 101 goes directly to S511.

The control unit 101 then determines in S511 if the memory card 120 can operate in a camera operation mode. If the memory card 120 can operate in the camera operation mode, the control unit 101 adds an item (icon) for a PC connection function to the displayed playback function menu in S816, and then goes to S513. If the memory card 120 cannot operate in the camera operation mode, the control unit 101 goes directly to S513.

The control unit 101 then determines in S513 if the memory card 120 can operate in a printing mode (if the memory card 120 supports a printing protocol). If the memory card 120 can operate in the printing mode, the control unit 101 adds an item (icon) for a print function to the displayed playback function menu in S818, and ends this process. If the memory card 120 cannot operate in the printing mode, the control unit 101 ends this process.

FIG. 9 shows examples of the display screen of the DSC before and after connecting to the network.

The left side in FIG. 9 shows an example of a displayed playback function menu in which an icon of the network is added displayed in S809 in FIG. 8. The icon 901 of the network connection function is displayed, but an item (icon) for a function using the wireless memory card is not displayed because the DSC is not connected to a wireless network.

When the icon 901 of the network connection function is selected, the DSC 100 connects to the wireless network, and if the memory card 120 can operate in the DLNA mode, camera operation mode, or print mode, the playback function menu changes as shown on the right in FIG. 9. An icon 902 of a television indicating that operation in the DLNA mode is possible, an icon 903 of a printer indicating that operation in the print mode is possible, and an icon 904 of a PC indicating that operation in the camera operation mode is possible are added and displayed in this example.

Because whether the memory card 120 supports all of the DLNA mode, the print mode and the camera operation mode is unknown, the functions that can be used may differ even if the mounted memory card is a wireless memory card. As a result, only the icons corresponding to functions supported by the mounted memory card are displayed.

The processes performed after selecting a function icon added as a result of mounting a wireless memory card are the same as described in the first embodiment, and further description thereof is omitted.

This embodiment of the invention has the same effect as the first embodiment even when connecting to a wireless network through an access point.

The invention is described above with reference to an exemplary embodiment, but the invention is not so limited and can be modified and changed in many ways without departing from the scope of the accompanying claims.

Other Embodiments

The foregoing embodiments describe configurations that, when a mounted memory card is a wireless memory card, display a menu with additional menu items as a menu from which menu items corresponding to communication protocols supported by the wireless memory card can be selected. However, configurations that contain menu items unrelated to these conditions, and display a menu with items that cannot be selected grayed out or deleted, are also conceivable.

In the second embodiment, for example, menu items corresponding to functions that use a wireless memory card may be grayed out when connecting to a wireless network, and items that can be selected based on the communication protocol supported by the wireless memory card could then be enabled.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-037689, filed on Feb. 27, 2013, which is hereby incorporated by reference herein its entirety.

What is claimed is:

1. An electronic device that uses a removable recording medium, comprising:
    a setting unit that sets an operation mode of a removable recording medium having a communication function, wherein the operational mode is one of a plurality of operational modes including at least two operational modes each of which uses a different communication protocol from each other;
    a determination unit that determines whether or not an attached recording medium has the communication function;
    a detection unit that detects an operational mode supported by the attached recording medium if the attached recording medium is determined to have the communication function;
    a display unit that displays a menu from which an item corresponding to the supported operational mode can be selected; and
    a control unit that controls, when the item corresponding to the operational mode is selected from the menu, the communication function to automatically select a communication protocol used in the supported operational mode corresponding to the selected item and to communicate with an external device using the selected communication protocol.

2. The electronic device described in claim 1, wherein:
    if the detection unit detects that the attached recording medium supports a plurality of operational modes each of which uses a different communication protocol from each other, the display unit displays a menu from which items respectively corresponding to the plurality of operational modes can be selected.

3. The electronic device described in claim 1, wherein:
    when the attached recording medium is determined to not have a communication function, the display unit displays a menu contains items corresponding to functions of the electronic device, and does not contain any item corresponding to a function using the communication function.

4. The electronic device described in claim 1, wherein:
    the item corresponding to the operational mode is displayed in the menu as text or an image representing a typical external device that can connect in the operational mode.

5. The electronic device described in claim 1, wherein:
    the communication function is a wireless communication function; and
    when the communication function is used to communicate with an external device through an access point, the detection unit detects the operational mode supported by the attached recording medium after connecting the electronic device to a wireless network managed by the access point.

6. The electronic device described in claim 1, wherein:
    the electronic device is an image capture apparatus; and
    the menu is a function menu related to an image displayed on a display device of the electronic device.

7. The electronic device described in claim 1, wherein:
    the plurality of operating modes can be set by the setting unit include a first mode using the PTP (Picture Transfer Protocol) and a second mode using the DLNA (Digital Living Network Alliance) protocol.

8. The electronic device described in claim 7, wherein:
    the plurality of operating modes can be set by the setting unit further include a third mode that uses a protocol for printing.

9. The electronic device described in claim 1, wherein:
    the attached recording medium is a memory card attached to the electronic device.

10. A control method of an electronic device that uses a removable recording medium including a removable recording medium having a communication function, wherein the removable recording medium having a communication function can be set an operational mode from among a plurality of operational modes including at least two operational modes each of which uses a different communication protocol from each other, the control method comprising the steps of:
    determining whether or not an attached recording medium has the communication function;
    detecting an operational mode supported by the attached recording medium if the recording medium is determined to have the communication function;
    displaying a menu from which an item corresponding to the supported operational mode can be selected; and
    controlling, when the item corresponding to the operational mode is selected from the menu, the communication function to automatically select a communication protocol used in the supported operational mode corresponding to the selected item and to communicate with an external device using the selected communication protocol.

11. A computer readable non-transitory storage medium storing a program causing a computer of an electronic device using a removable recording medium to execute the steps of the control method of an electronic device described in claim 10.

12. The electronic device described in claim 1, wherein the communication function is a wireless communication function and the display unit displays the menu before connecting to a wireless network.

13. The electronic device described in claim 12, wherein the control unit controls the communication function to automatically select the communication protocol before connecting the wireless network.

14. The electronic device described in claim 1, when the item corresponding to the operational mode is selected from the menu, the control unit further controls the setting unit to set the operational mode corresponding to the selected item to the attached recording medium before the communication function starts the communication using the selected communication protocol.

15. The electronic device described in claim 1, wherein if an operational mode different from that corresponding to the selected item is currently set to the attached recording medium, the control unit further controls the setting unit to set the operational mode corresponding to the selected item to the attached recording medium.

* * * * *